United States Patent Office 3,793,220
Patented Feb. 19, 1974

3,793,220
METHOD FOR STABILIZING 1,1,1 - TRICHLOR-
ETHANE AND PRODUCT PRODUCED THEREBY
Arsene Isard, 20 Avenue Albert ler de Belgique, and
Daniel Pillet, 131 Cours de la Liberation, both of
Grenoble, France
No Drawing. Filed Apr. 1, 1971, Ser. No. 130,505
Claims priority, application France, Apr. 3, 1970,
7012126
Int. Cl. C11d 7/52
U.S. Cl. 252—171                                3 Claims

ABSTRACT OF THE DISCLOSURE 1,1,1-trichlorethane, an industrial solvent, is stabilized to prevent its reaction with metals by the addition thereto of from about 0.1% to about 10% of a stabilizing agent comprising at least one substituted oxazole containing 1 to 3 alkyl radicals and having a boiling point at ambient pressure below about 140° C. in combination with one or more other stabilizers having a boiling point in the range from about 50° C. to about 130° C. and having a molecular structure which comprises at least one of the molecular groups consisting of ethylenic bond, acetylenic bond, acetal, ketone, alcohol, nitrile, amine, ester function, ether or thioether bond-bridge, nitrated group and 1,2-epoxy group, said substituted oxazole being present in the stabilizing combination at a level of not less than about 5% by weight of the combination.

BACKGROUND OF THE INVENTION

(I) Field of the invention

This invention relates to a method for the stabilization of 1,1,1-trichlorethane and the product produced thereby. In particular, it relates to the stabilization of 1,1,1-trichlorethane, an industrial solvent, by the addition thereto of alkyl substituted oxazoles, in combination with other stabilizing agents.

(II) Description of the prior art 1,1,1-trichlorethane, or methylchloroform, is an industrial solvent having high dissolving power and flame-resistant properties. It is used as a propellant in aerosols and also for degreasing metallic pieces. Despite its excellent properties as an industrial solvent, 1,1,1-trichlorethane has the serious limitation of being much more reactive with respect to metals than other chlorinated hydrocarbons such as chloroform, carbon tetrachloride, trichlorethylene or perchlorethylene. This reactivity is particularly important with respect to light metals such as aluminum, magnesium or their alloys and results in a rapid attack on the metal and a strong decomposition of the solvent.

In order to lessen its reactivity, stabilizing substances have been added to 1,1,1-trichlorethane; generally, many substances, which are effective with other chlorinated hydrocarbons, have a very poor efficiency with respect to 1,1,1-trichlorethane. The agents selected for the stabilization of 1,1,1-trichlorethane should be effective in the vapor phase as well as in the liquid phase, particularly for such operations as hot degreasing and for regeneration of the solvent by distillation. Lastly, they should not cause the formation upon contact with acidic compositions, compounds having low volatility and/or insoluble compounds possessing corrosive character.

According to French Pat. No. 1,555,883, oxazole, a heterocyclic compound of the formula

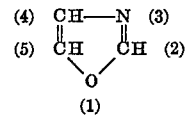

meets the above criteria and achieves a good degree of stabilization for 1,1,1-trichlorethane.

However, oxazole is relatively expensive to manufacture and it would therefore be desirable to employ another more economical stabilizing agent in 1,1,1-trichlorethane which is at least as effective as oxazole.

SUMMARY OF THE INVENTION

The applicants have unexpectedly discovered that substituted oxazoles containing 1 to 3 alkyl radicals and having boiling points below about 140° C. at ambient pressure, when added to 1,1,1-trichlorethane at a level of from 0.1% to about 10% by weight of this chlorinated solvent and in combination with one or more other stabilizing agents for 1,1,1-trichlorethane having boiling points at ambient pressure from about 50° C. to about 130° C., the substituted oxazole or mixture of substituted oxazoles being present in the stabilizing combination at a level of at least about 5% by weight of the combination, are highly effective stabilizers for 1,1,1-trichlorethane.

Other compounds closely related to the lower alkyl substituted oxazoles have not demonstrated the required stabilizing effect for 1,1,1-trichlorethane as shown in Example 3 which reports the poor results obtained with the use of 2-methyl-oxazoline.

The lower alkyl substituted oxazoles of this invention are more easily and cheaply manufactured than oxazole and therefore are more advantageously used for stabilizing 1,1,1-trichlorethane than the latter compound.

DESCRIPTION OF THE PREFERRED EMBODIMENTS

While the lower alkyl substituted oxazole compounds of this invention are effectively employed in 1,1,1-trichlorethane at a level of from about 0.1% to about 10% by weight of 1,1,1-trichlorethane, it is especially advantageous to use from about 1% to about 6% of such oxazoles. 2,4-dimethyloxazole and 2,4,5-trimethyl oxazole have been found to be particularly advantageous stabilizers for 1,1,1-trichlorethane.

The alkyl substituted oxazoles of this invention are used in combination with one or more other compounds known to contribute to the stabilization of 1,1,1-trichlorethane at a level of at least about 5% by weight of the combination. The latter stabilizers are selected from amongst those compounds having a boiling point between 50° and 130° C. and possessing an ethylenic or acetylenic bond or an acetal, ketone, alcohol, nitrile, amine, ester, ether, thioether, nitro or epoxy group. Among the supplementary stabilizing agents, nitromethane, epoxybutane, tertiary butanol and dioxane have been found to be of particular interest.

A test for the determination of stabilizer effectiveness was conducted according to the test described in the National Institute of Dry Cleaners, Specification 3–55 which was established for use with trichlorethylene. This test comprised introducing 150 ml. of pure 1,1,1-trichlorethane and the stabilizer system to be tested into a 300 ml. flask equipped with a Soxhlet extractor having a volume of about 70 ml. and a cooling condenser of the Allihn type with a circulation of coolant sufficient to maintain a temperature of 15° C. Three aluminum plates were then introduced into the system, the first placed in the flask, the second in the bottom of the Soxhlet extractor and the third was suspended in the lower part of the cooling condenser so that solvent vapors would condense upon the plate. All of the plates were identical (50 x 10 x 3 mm.) and possessed along one of their sides, a lengthwise groove of 1 x 1 mm. The flask was adapted to include a tapered tube through which moist air was allowed to enter while the gases evolving at the top of the Allihn cooling condenser were conveyed to an Erlenmeyer flask containing pure water. A 100-watt lamp was placed a few centimeters from the vapor top of the Soxhlet extractor.

The stabilization test comprised maintaining the medium containing the stabilizing agent to be tested at the boiling point of the medium for 48 hours while adjusting the heat input so as to cause the composition to flow back at such a rate that the extractor emptied every 8-10 minutes. Following this procedure, analyses were carried out to determine the quantity of acid (expressed as HCl) in the flask, the quantity of acid (expressed as HCl) in the Erlenmeyer flask, and an evaluation of the physical appearance of the aluminum plates.

obtained by employing the following products: 2-methyl oxazole (boiling point 87–88° C.), 4-methyl oxazole (boiling point 87–89° C.), 5-ethyl oxazole (boiling point 118–119° C.), 2,4-dimethyl oxazole (boiling point 108° C.), 2,5-dimethyl oxazole (boiling point 117–118° C.), 2,4,5-trimethyl oxazole (boiling point 133–134° C.).

We claim:

1. A composition of matter consisting essentially of 1,1,1 - trichloroethane and a combination of stabilizing agents, said combination of stabilizing agents being added in an amount of from 0.1% to about 10% by weight of 1,1,1 - trichloroethane, said combination of stabilizing agents consisting essentially of at least one oxazole substituted with one to three lower alkyl groups and having a boiling point at one atmospheric pressure below about 140° C. and at least one other supplementary stabilizing agent having a boiling point between about 50° and about 130° C. selected from 1,2-epoxy butane, tertiary butanol, dioxane, nitromethane, or mixtures thereof, said alkyl substituted oxazole(s) being present in at least about 5% by weight of the combination of stabilizing agents.

2. The composition of claim 1 wherein said alkyl substituted oxazole stabilizing agent is added in an amount of from 1 to about 6% by weight of 1,1,1-trichlorethane.

3. The composition of claim 1 wherein the stabilizer or stabilizer mixture is added at a level of 1 to 6% by weight of 1,1,1-trichlorethane.

| Example No. | Stabilizing agents Nature | Percent by weight | Acid released in the— Flask | Erlenmeyer | Appearance of the aluminum plates in the— Flask | Soxhlet | Cooling condenser |
|---|---|---|---|---|---|---|---|
| 1 | No stabilizer | 0 | Carbon mass | (¹) | Large black deposit | | |
| 2 | 2,4-dimethyl oxazole | 4 | 0 | 0 | Very faintly attacked | Stains | Stains. |
| 3 | 2-methyl oxazoline | 4 | Yellowish appearance | + | Attacked | Large stains | Stains faintly attacked. |
| 4 | Dioxane | 4 | Not determined | 0 | Intact | Stains very faintly attacked | Stains. |
| 5 | 2,4 dimethyl oxazole<br>Dioxane | 0.5<br>3.5 | 0 | 0 | do | Stains | Do. |
| 6 | 1,2-epoxy butane<br>Nitromethane<br>Tertiary butanol | 1<br>1<br>2 | 0 | 0 | Stains | Intact | Numerous stains. |
| 7 | 2,4 dimethyl oxazole<br>Nitromethane<br>Tertiary butanol | 1<br>1<br>2 | 0 | 0 | do | do | Intact. |
| 8 | 2,4-dimethyl oxazole<br>Nitromethane<br>1,2-epoxy butane | 2<br>1<br>1 | 0 | 0 | Several stains | do | Do. |
| 9 | 2,4 dimethyl oxazole<br>Nitromethane<br>1,2 epoxy butane<br>Tertiary butanol | 1<br>1<br>1<br>1 | 0 | 0 | Intact | do | Do. |
| 10 | 2,4,5-trimethyl oxazole<br>Nitromethane<br>1,2 epoxy butane<br>Tertiary butanol | 1<br>1<br>1<br>1 | 0 | 0 | do | do | Do. |
| 11 | 5-ethyl oxazole<br>Epoxy-butane<br>Nitromethane<br>Tertiary butanol | 1<br>1<br>1<br>1 | 0 | 0 | do | do | Do. |

¹ Not determined but very substantial.

While the invention has been described hereinabove in terms of a number of examples of the process thereof and the product produced thereby, the invention itself is not limited thereto, but rather comprehends all modifications of and departures from those examples properly falling within the spirit and scope of the appended claims. In particular, in the examples of the invention, the substituted oxazoles are 2,4-dimethyloxazole and 2,4,5-trimethyloxazole, but as much interesting results have been

References Cited

UNITED STATES PATENTS 3,494,968   2/1970   Archer et al. _____ 260—652.5
2,517,893   8/1950   Larchar _____ 252—171
2,947,792   8/1960   Skeeters _____ 260—652.5

WILLIAM E. SCHULZ, Primary Examiner

U.S. Cl. X.R.

260—652.5